US008374963B1

(12) United States Patent
Billman

(10) Patent No.: US 8,374,963 B1
(45) Date of Patent: Feb. 12, 2013

(54) METHOD AND SYSTEM FOR ELECTRONIC CHECKING

(75) Inventor: Bradly Jay Billman, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 510 days.

(21) Appl. No.: 12/031,477

(22) Filed: Feb. 14, 2008

(51) Int. Cl.
*G06Q 40/00* (2006.01)

(52) U.S. Cl. .............. 705/44; 705/39; 705/42; 705/76; 705/36 R; 705/1.1

(58) Field of Classification Search .............. 705/1, 44, 705/1.1, 42, 39, 54, 40, 76, 78, 45, 33, 36 R; 382/317, 164; 235/379, 380
See application file for complete search history.

(56) References Cited

U.S. PATENT DOCUMENTS

| | | | |
|---|---|---|---|
| 4,346,442 A | 8/1982 | Musmanno | |
| 4,737,911 A | 4/1988 | Freeman, Jr. | |
| 4,960,981 A | 10/1990 | Benton et al. | |
| 5,122,950 A | 6/1992 | Benton et al. | |
| 5,134,564 A | 7/1992 | Dunn et al. | |
| 5,175,682 A | 12/1992 | Higashiyama et al. | |
| 5,233,547 A | 8/1993 | Kapp et al. | |
| 5,265,008 A | 11/1993 | Benton et al. | |
| 5,373,550 A | 12/1994 | Campbell et al. | |
| 5,590,196 A | 12/1996 | Moreau | |
| 5,594,225 A | 1/1997 | Botvin | |
| 5,677,955 A | 10/1997 | Doggett et al. | |
| 5,859,935 A | 1/1999 | Johnson et al. | |
| 5,903,881 A * | 5/1999 | Schrader et al. ............ 705/42 |
| 6,021,202 A | 2/2000 | Anderson et al. | |
| 6,128,603 A | 10/2000 | Dent et al. | |
| 6,181,837 B1 | 1/2001 | Cahill et al. | |
| 6,282,523 B1 | 8/2001 | Tedesco et al. | |
| 6,339,766 B1 | 1/2002 | Gephart | |
| 6,354,490 B1 | 3/2002 | Weiss et al. | |
| 6,502,747 B1 | 1/2003 | Stoutenburg et al. | |
| 6,647,136 B2 | 11/2003 | Jones et al. | |
| 6,760,414 B1 | 7/2004 | Schurko et al. | |
| 7,388,683 B2 | 6/2008 | Rodriguez et al. | |
| 7,391,897 B2 | 6/2008 | Jones et al. | |
| 7,577,614 B1 | 8/2009 | Warren et al. | |
| 2002/0013767 A1* | 1/2002 | Katz ................................. 705/39 |

(Continued)

FOREIGN PATENT DOCUMENTS

WO     WO 98/37655 A1     8/1998

OTHER PUBLICATIONS

"Quicken Bill Pay", [Retrieved on Nov. 27, 2007], Retrieved from the internet <URL: http://quicken.intuit.com/quicken-bill-pay.jhtml>, (Nov. 27, 2007),2 pgs.

(Continued)

*Primary Examiner* — John H Holly
(74) *Attorney, Agent, or Firm* — Perkins Coie LLP

(57) ABSTRACT

Methods and systems for electronic checking are described. A graphical representation of an electronic check may be provided for presentation to a providing user from which an electronic funds transfer may be initiated. The electronic check may be generated when desired. A payment date selection may be received for an electronic check on a date within the electronic account register and the electronic check may be indicated for the particular date in the electronic account register. The electronic check may be received and associated with a receiving user. An estimated charge for an actual charge may be replaced in the electronic account register in accordance with analyzing one or more actual charges.

21 Claims, 21 Drawing Sheets

U.S. PATENT DOCUMENTS

| | | |
|---|---|---|
| 2002/0023055 A1 | 2/2002 | Antognini et al. |
| 2003/0074315 A1 | 4/2003 | Lam |
| 2003/0078883 A1 | 4/2003 | Stewart et al. |
| 2003/0135457 A1 | 7/2003 | Stewart et al. |
| 2003/0187790 A1 | 10/2003 | Swift et al. |
| 2005/0033690 A1 | 2/2005 | Antognini et al. |
| 2006/0212393 A1 | 9/2006 | Brown |
| 2007/0262137 A1 | 11/2007 | Brown |
| 2008/0086420 A1 | 4/2008 | Gilder et al. |
| 2008/0086421 A1 | 4/2008 | Gilder et al. |
| 2009/0171795 A1 | 7/2009 | Clouthier et al. |

OTHER PUBLICATIONS

"Start to simplify with Check Imaging: a smarter way to bank", [Retrieved on Nov. 27, 2007], Retrieved from the internet <URL: http://www.midnatbank.com/Internet%20Banking/Internet_Banking.html>, (Nov. 27, 2007), 3 pgs.

* cited by examiner

| # | DATE | DESCRIPTION OF TRANSACTION | PAYMENT/DEBIT | CAT | FEE | DEPOSIT/CREDIT | BALANCE |
|---|---|---|---|---|---|---|---|
| E-501 | 1/21 | GRADUATION | $150.00 | GIFT | 0.00 | 0.00 | $10,000.00 |
| 300 | 1/25 | SCHNUCKS | $100.00 | FOOD | 0.00 | 0.00 | $9,900.00 |
| E-502 | 1/28 | CHASE | $2,000.00 | CC | 0.00 | 0.00 | $7,900.00 |
| E-503 | 2/1 | MEMBER #355 | $125.00 | GIFT | 0.00 | 0.00 | $7,775.00 |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

FIGURE 14

| # | DATE | DESCRIPTION OF TRANSACTION | PAYMENT/DEBIT | CAT | FEE | DEPOSIT/CREDIT | BALANCE |
|---|---|---|---|---|---|---|---|
| E-501 | 1/21 | GRADUATION | $150.00 | GIFT | 0.00 | 0.00 | $10,000.00 |
| 300 | 1/25 | GROCERY | $100.00 | FOOD | 0.00 | 0.00 | $9,900.00 |
| E-502 | 1/28 | CREDIT CARD | $2,000.00 | CC | 0.00 | 0.00 | $7,900.00 |
| E-503 | 2/1 | FRANK G. BEAR | $125.00 | GIFT | 0.00 | 0.00 | $7,775.00 |
| | | | | | | | |
| | | | | | | | |
| | | | | | | | |
| | | | | | | | |
| | | | | | | | |
| | | | | | | | |
| | | | | | | | |
| | | | | | | | |

FIGURE 15

METHOD AND SYSTEM FOR ELECTRONIC CHECKING

RELATED APPLICATIONS

This application is related to U.S. application titled "METHOD AND SYSTEM FOR ELECTRONIC CHECKING" Ser. No. 12/031,444 filed on even date herewith; and to U.S. application titled "METHOD AND SYSTEM FOR ELECTRONIC CHECKING" Ser. No. 12/031,463 filed on even date herewith; and to U.S. application titled "METHOD AND SYSTEM FOR ELECTRONIC CHECKING" Ser. No. 12/031,484 filed on even date herewith; and to U.S. application titled "METHOD AND SYSTEM FOR ELECTRONIC CHECKING" Ser. No. 12/031,497 filed on even date herewith.

FIELD

This application relates to a method and system for data processing, and more specifically to methods and systems for electronic checking.

BACKGROUND

A user of financial services may pay money to others from a user account by writing paper checks and withdrawing cash from an ATM machine. The user may record these financial transactions in a check register.

SUMMARY

In an example embodiment, a payment amount and identification of a receiving user for an electronic check may be received. A graphical representation of the electronic check may be provided for presentation to a providing user. The graphical representation may include the payment amount and the identification of the receiving user. The receiving user is notified of the electronic check. An electronic funds transfer may be initiated in the payment amount from the providing user to the receiving user.

In an example embodiment, confirmation of an electronic check may be received in a payment amount from a providing user to a receiving user. The account of the receiving user may be updated in accordance with an electronic funds transfer associated with the electronic check. The electronic check may be associated with the receiving user. The electronic check may identify the payment amount and the providing user. A notification regarding the electronic check may be provided to the receiving user.

In an example embodiment, transaction data associated with an electronic funds transfer may be stored. The transaction data may include payment amount, receiving user identification, and providing user identification. A request for a record of an electronic check associated with the electronic funds transfer may be received. The electronic check may be generated in accordance with the payment amount, the receiving user identification, and the providing user identification. The electronic check may be provided in accordance with the request.

In an example embodiment, an electronic account register may be provided for presentation to a providing user in a user interface. A payment amount and identification of a receiving user may be received for an electronic check. A payment date selection may be received for the electronic check on a particular date within the electronic account register. The electronic check may be indicated for the particular date in the electronic account register. The electronic funds transfer may be initiated in the payment amount from the providing user to the receiving user in accordance with the payment date selection.

In an example embodiment, an electronic account register may be provided for presentation to a providing user in a user interface. The electronic account register may indicate one or more electronic checks scheduled for processing at a future date. A running balance may be computed in accordance with the one or more electronic checks. The appearance of at least one of the one or more electronic check indications may be altered in accordance with the computed running balance.

In an example embodiment, an electronic account register may be provided for presentation to a providing user in a user interface. The electronic account register may include indications of one or more electronic checks. A determination of whether a transaction has not completed beyond an anticipated clearing date for a particular electronic check may be made. The appearance of an indication of the particular electronic check within the user interface may be altered.

In an example embodiment, an electronic account register may be provided for presentation to a providing user in a user interface. An estimated charge and an identifier for the estimated charge may be received. The estimated charge and the identifier may be indicated in the electronic account register. One or more actual charges may be analyzed. The estimated charge may be replaced with a particular actual charge of the one or more actual charges in accordance with the analyzing of the one or more actual charges. The actual charge may be indicated in the electronic account register.

BRIEF DESCRIPTION OF DRAWINGS

Embodiments are illustrated by way of example and not limitation in the figures of the accompanying drawings, in which like references indicate similar elements and in which:

FIGS. 14 and 15 are diagrams of example electronic account registers in accordance with an example embodiment;

DETAILED DESCRIPTION

Example methods and systems for electronic checking are described. In the following description, for purposes of explanation, numerous specific details are set forth in order to provide a thorough understanding of example embodiments. It will be evident, however, to one skilled in the art that the present invention may be practiced without these specific details.

Figure 1:
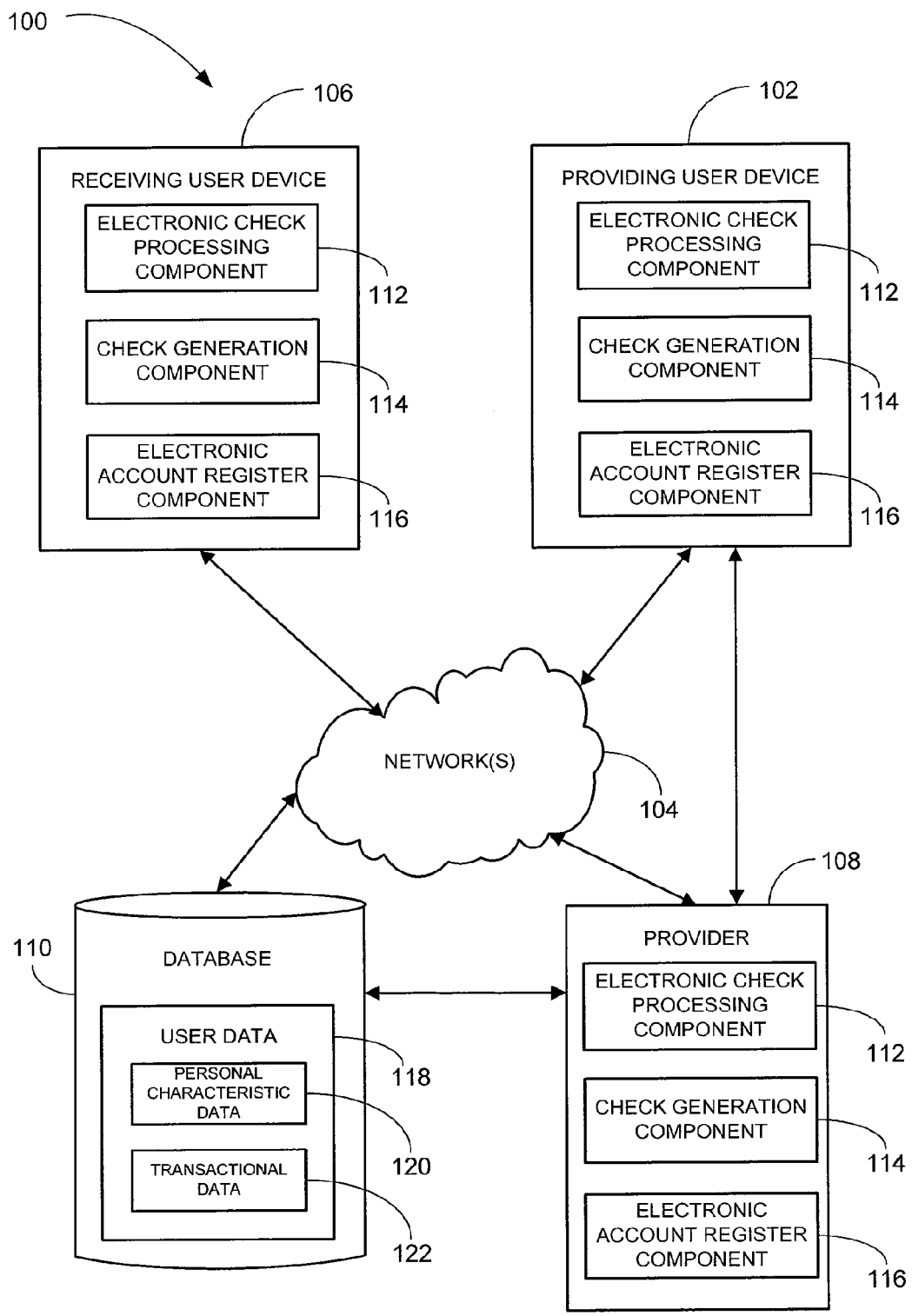
FIG. 1 is a block diagram of an example content system according to an example embodiment.

FIG. 1 illustrates an example content system 100 in which a providing user associated with a providing user device 102 may provide an electronic check over a network 104 to a receiving user associated with a receiving user device 106. The electronic check may be used to electronically provide funds from one user or entity to another without the need of a tangible medium (e.g., a paper check or a gift card). A provider 108 may enable the providing of the electronic check and/or process an electronic funds transfer associated with the electronic check.

The network 104 over which the providing user device 102, the receiving user device 106, and the provider 108 are in communication may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

Examples of the providing user device 102 and the receiving user device 106 include a set-top box (STB), a receiver card, a mobile telephone, a personal digital assistant (PDA), a MP3 player, and a computing system; however other devices may also be used.

The provider 108 may be in a client server relationship, peer-to-peer relationship, or another type of relationship with the user device 102 and the receiving user device 106.

An electronic check processing component 112, a check generation component 114, and/or an electronic account register component 116 may be deployed within the providing user device 102, the receiving user device 106, and/or the provider 108. The electronic check processing component 112 enables an electronic check to be provided from a providing user to a receiving user. The check generation component 114 generates a request check from transaction information associated with an electronic funds transfer. The electronic account register component 116 provides an electronic account register for use (e.g., by a providing user or a receiving user). Other components may also be deployed in the providing user device 102, the receiving user device 106, and/or the provider 108.

The components 112, 114, 116 may use user data 118 stored in a database 110 in processing the electronic checks, generating the electronic checks, or providing an electronic account register for use.

The user data 118 may include personal characteristic data 120 and/or transactional data 122. The personal characteristic information 12 may include, by way of example, age data, rank data (e.g., military rank), gender data, address data, job data, income data, family data, and/or a user level. Other types of information may also be used.

The transactional data 122 may relate to transactions of the user involving the provider 108 or others. For example, the transactional data 122 may include information regarding an electronic check, a nonelectronic check, a debit transaction, or a deposit.

Figure 2:
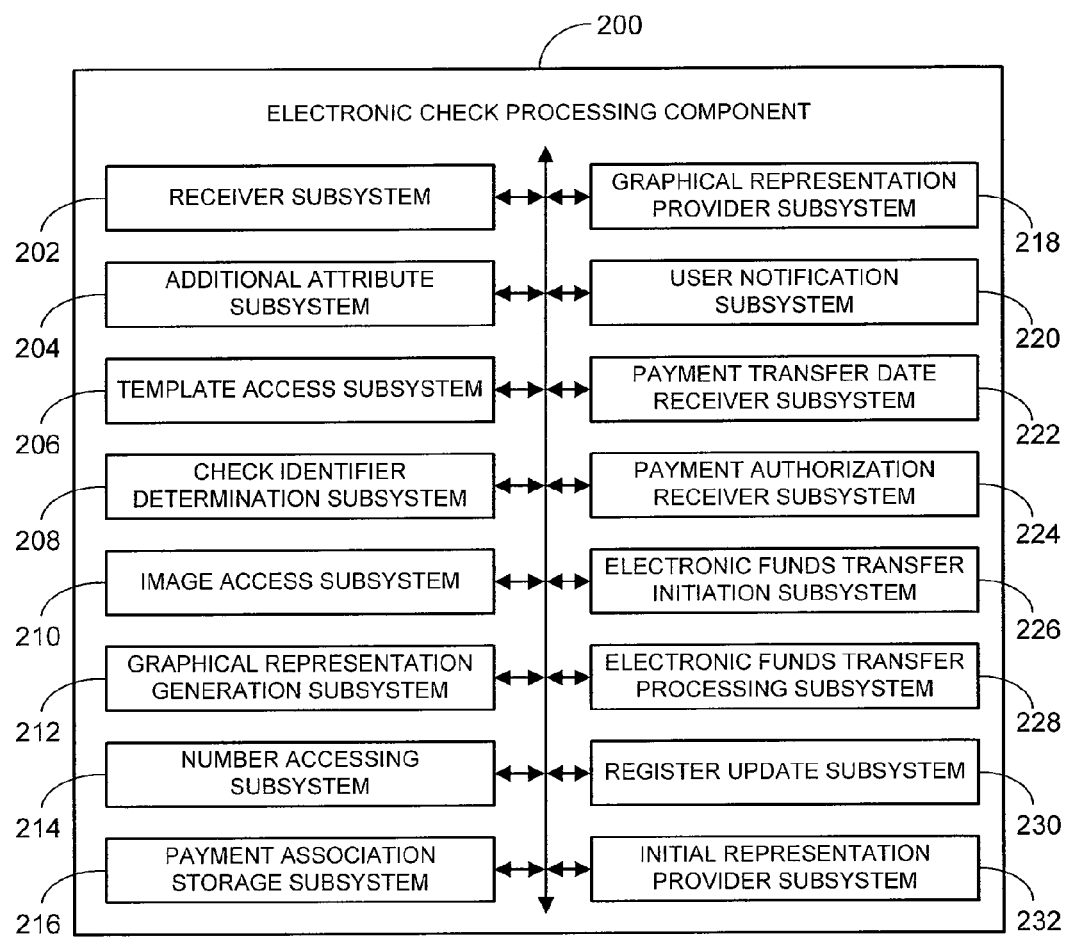
FIGS. 2 and 3 are block diagrams of example electronic check processing components that may be deployed in the content system of FIG. 1 according to an example embodiment.

FIG. 2 illustrates an example electronic check processing component 200 that may be deployed in the providing user device 102, the receiving user device 106, and/or the provider 108 of the content system 100 as the electronic check processing component 112 (see FIG. 1) or otherwise deployed in another system.

The electronic check processing component 200 may include a receiver subsystem 202, an additional attribute subsystem 204, a template access subsystem 206, a check identifier determination subsystem 208, an image access subsystem 210, a graphical representation generation subsystem 212, a number accessing subsystem 214, a payment association storage subsystem 216, a graphical representation provider subsystem 218, a user notification subsystem 220, a payment transfer date receiver subsystem 222, a payment authorization receiver subsystem 224, an electronic funds transfer initiation subsystem 226, an electronic funds transfer processing subsystem 228, a register update subsystem 230, and/or an initial representation provider subsystem 232. Other subsystems may also be used.

The receiver subsystem 202 receives a payment amount and/or identification of a receiving user for an electronic check. The additional attribute subsystem 204 receives a payment description, a payment date, and/or a signature associated with the providing user. Other attributes for an electronic check may also be received by the additional attribute subsystem 204.

The template access subsystem 206 accesses a template associated with the providing user. The check identifier determination subsystem 208 determines a check identifier. The image access subsystem 210 accesses an image identified by the providing user. The image may be a picture of a person, a pattern, or the like.

The graphical representation generation subsystem 212 generates the graphical representation of the electronic check in accordance with an image, the check identifier, signature, the template, the payment amount, the payment description, the payment amount, and/or the identification of the receiving user.

The number accessing subsystem 214 accesses an account number and a routing number for the receiving user and/or the providing user. The accessing of the account number and the routing number of the receiving user may be in accordance with a payment association. The payment association storage subsystem 216 stores a payment association for the receiving user with the account number and the routing number.

The graphical representation provider subsystem 218 provides a graphical representation of the electronic check for presentation to a providing user. The graphical representation may include the payment amount, the identification of the receiving user, the account number and/or the routing number.

The user notification subsystem 220 notifies the receiving user of the electronic check. The payment transfer date receiver subsystem 222 receives a payment transfer date from the receiving user. The payment authorization receiver subsystem 224 receives payment authorization from the providing user.

The electronic funds transfer initiation subsystem 226 initiates an electronic funds transfer in the payment amount from the providing user to the receiving user. The initiation of the electronic funds transfer may be in accordance with the payment date, with the receipt of payment authorization, and/or with the account number and the routing number of the receiving user and/or the providing user.

The electronic funds transfer processing subsystem 228 processes the electronic funds transfer in the payment amount from the providing user to the receiving user. The register update subsystem 230 updates an electronic check register associated with the providing user in accordance with the initiating of the electronic funds transfer. The initial representation provider subsystem 232 provides an initial representation of the electronic check.

Figure 3:
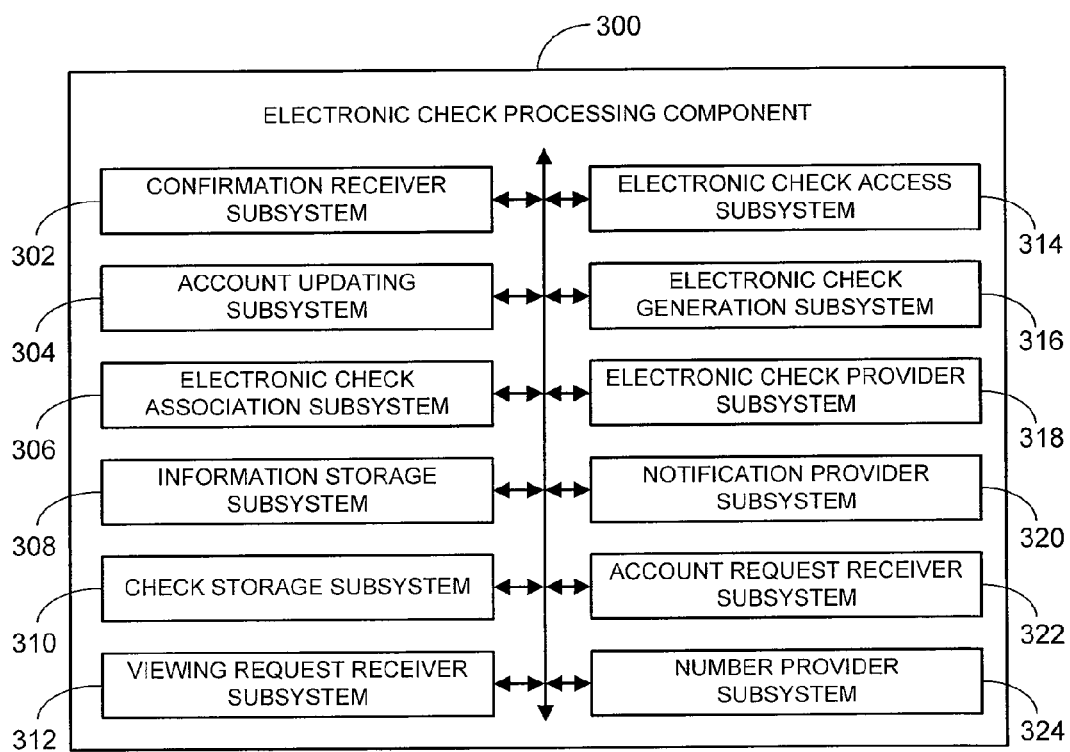

FIG. 3 illustrates an example electronic check processing component 300 that may be deployed in the providing user device 102, the receiving user device 106, and/or the provider 108 of the content system 100 as the electronic check processing component 112 (see FIG. 1) or otherwise deployed in another system.

The electronic check processing component 300 may include a confirmation receiver subsystem 302, an account updating subsystem 304, an electronic check association subsystem 306, an information storage subsystem 308, a check storage subsystem 310, a viewing request receiver subsystem 312, an electronic check access subsystem 314, an electronic check generation subsystem 316, an electronic check provider subsystem 318, a notification provider subsystem 320, a account request receiver subsystem 322, and/or a number provider subsystem 324. Other subsystems may also be used.

The confirmation receiver subsystem 302 receives confirmation of an electronic check in a payment amount from a providing user to a receiving user. The account updating subsystem 304 updates the account of a receiving user in accordance with an electronic funds transfer associated with an electronic check.

The electronic check association subsystem 306 associates an electronic check with the receiving user. The information storage subsystem 308 stores information associated with the electronic funds transfer. The information may include the payment amount and identification of the providing user.

The check storage subsystem 310 stores an electronic check. The viewing request receiver subsystem 312 receives a viewing request for the electronic check. The electronic check access subsystem 314 accesses the stored electronic check.

The electronic check generation subsystem 316 generates the electronic check from the stored information. The electronic check provider subsystem 318 provides the electronic check (e.g. for presentation to the providing user and/or the receiving user).

The notification provider subsystem 320 provides a notification regarding the electronic check to the receiving user. The account request receiver subsystem 322 receives an account request for an account number and a routing number of the account of the receiving user. The number provider subsystem 324 provides the account number and the routing number.

Figure 4:
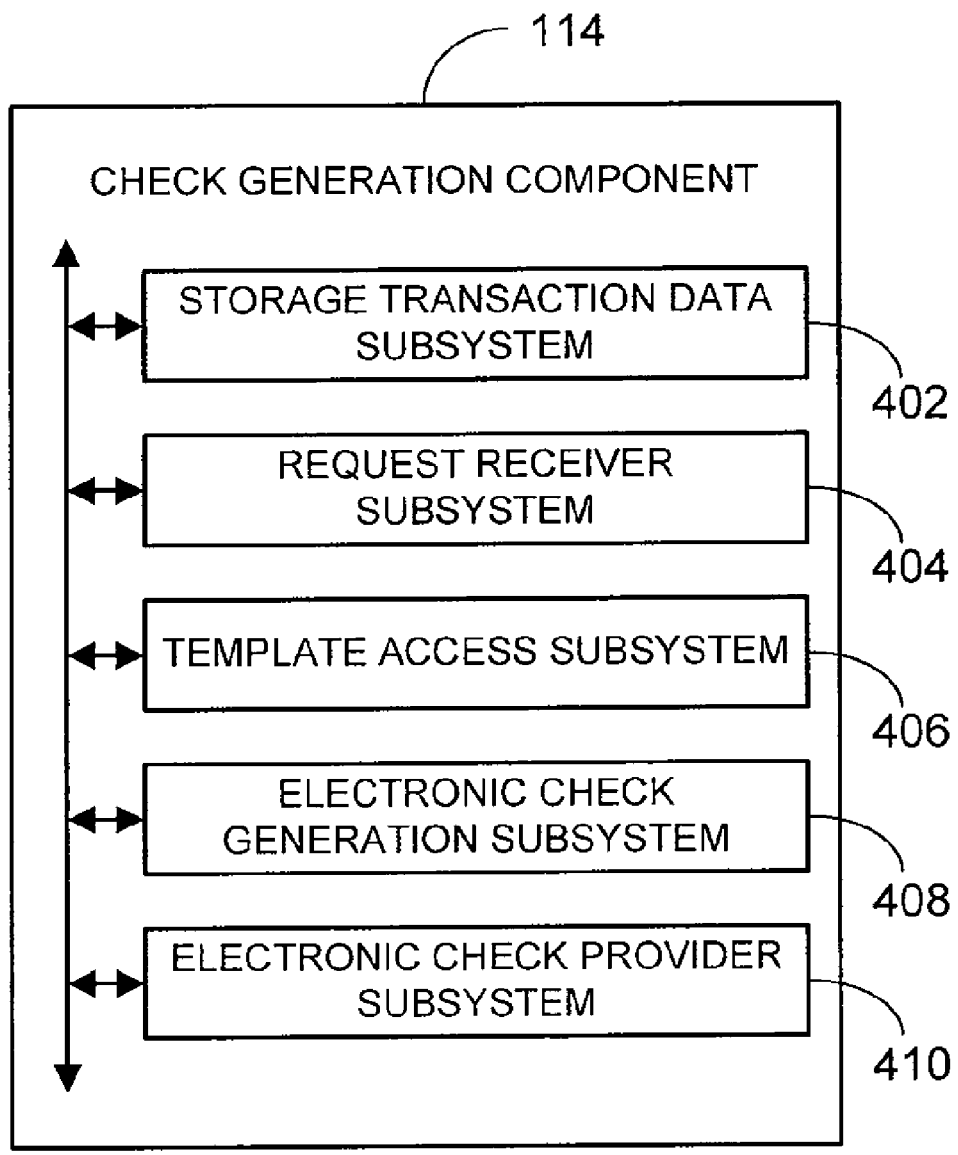
FIG. 4 is a block diagram of an example check generation component that may be deployed in the content system of FIG. 1 according to an example embodiment.

FIG. 4 illustrates an example check generation component 114 that may be deployed in the providing user device 102, the receiving user device 106, and/or the provider 108 of the content system 100 (see FIG. 1) or otherwise deployed in another system.

The check generation component 114 may include a storage transaction data subsystem 402, a request receiver subsystem 404, a template access subsystem 406, an electronic check generation subsystem 408, and/or an electronic check provider subsystem 410. Other subsystems may also be used.

The storage transaction data subsystem 402 stores transaction data associated with an electronic funds transfer. The transaction data includes payment amount, receiving user identification, and/or providing user identification.

The request receiver subsystem 404 receives a request for a record of an electronic check associated with the electronic funds transfer. The template access subsystem 406 accesses a template associated with the electronic funds transfer.

The electronic check generation subsystem 408 generates the electronic check in accordance with a template, the payment amount, the receiving user identification, and/or the providing user identification. The electronic check provider subsystem 410 provides the electronic check in accordance with the request. The electronic check may, by way of example, be provided for presentation to a providing user and/or a receiving user.

Figure 5:
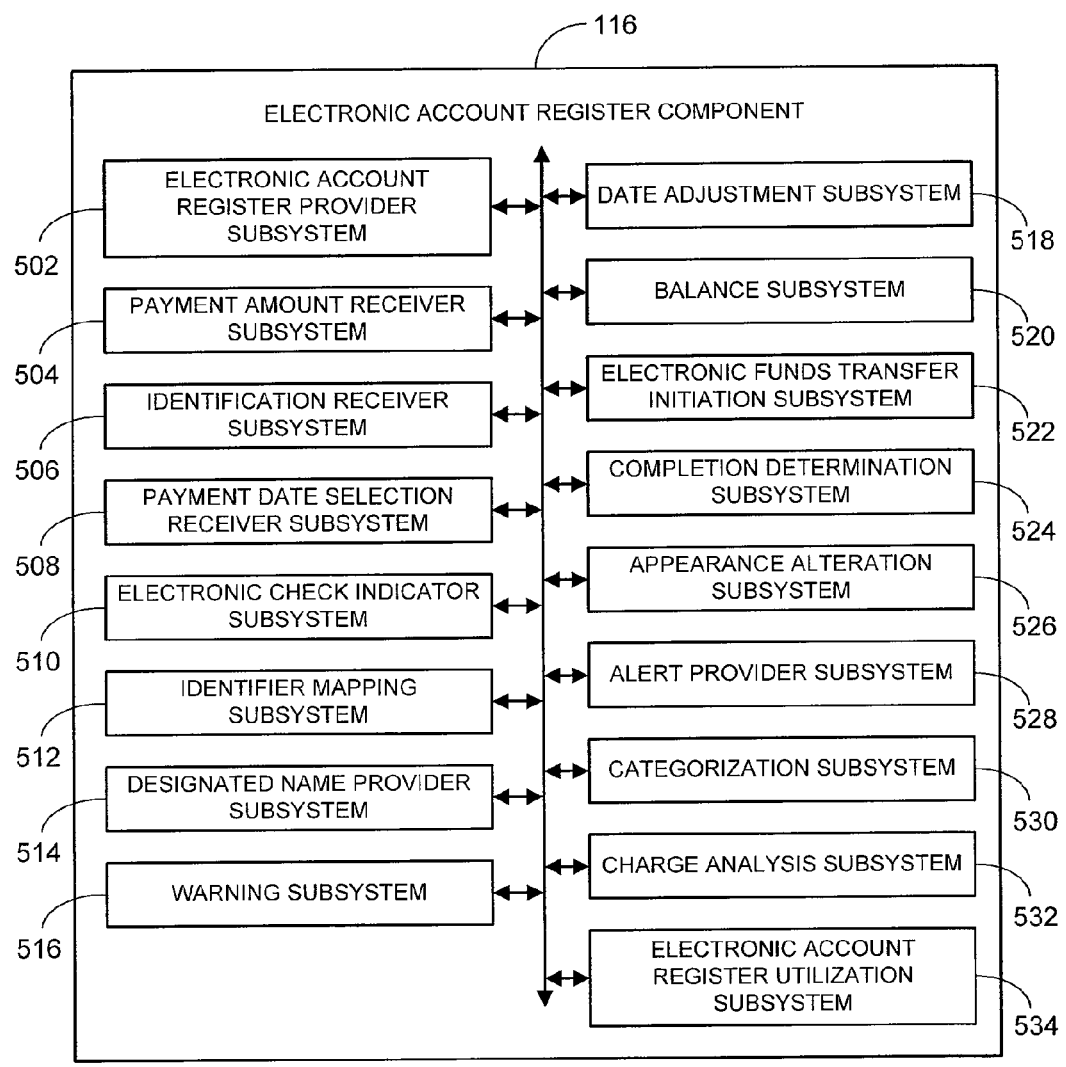
FIG. 5 is a block diagram of an example electronic account register component that may be deployed in the content system of FIG. 1 according to an example embodiment.

FIG. 5 illustrates an example electronic account register component 116 that may be deployed in the providing user device 102, the receiving user device 106, and/or the provider 108 of the content system 100 or otherwise deployed in another system.

The electronic account register component 116 may include an electronic account register provider subsystem 502, a payment amount receiver subsystem 504, an identification receiver subsystem 506, a payment data selection receiver subsystem 508, an electronic check indicator subsystem 510, an identifier mapping subsystem 512, a designated name provider subsystem 514, a warning subsystem 516, a date adjustment subsystem 518, a balance subsystem 520, an electronic funds transfer initiation subsystem 522, a completion determination subsystem 524, an appearance alteration subsystem 526, a alert provider subsystem 528, a categorization subsystem 530, a charge analysis subsystem 532, and/or an electronic account register utilization subsystem 534. Other subsystems may also be used.

The electronic account register provider subsystem 502 provides an electronic account register for presentation to a providing user in a user interface. The electronic account register may indicate one or more electronic checks that have already been processed, are currently being processed, and/or are scheduled for processing at a future date. Other entries including nonelectronic checks, debit transactions, and deposits may also be included in the electronic account register.

The payment amount receiver subsystem 504 receives a payment amount for an electronic check. The identification receiver subsystem 506 receives identification of a receiving user for an electronic check.

The payment data selection receiver subsystem 508 receives a payment date selection for the electronic check on a particular date within the electronic account register. The electronic check indicator subsystem 510 indicates the electronic check for the particular date in the electronic account register.

The identifier mapping subsystem 512 maps an identifier of the electronic check to a designated name within the electronic account register. The designated name provider subsystem 514 provides the designated name within electronic account register for presentation.

The warning subsystem 516 accesses an advanced warning setting and provides an electronic check alert in accordance with the particular date and the advanced warning setting. For example, a warning date selection of another particular date of the electronic account register for the electronic check may be received, a warning notation may be indicated within the electronic check for the another particular date in the electronic account register, and a warning may be provided to the providing user in accordance with the warning date selection.

The date adjustment subsystem 518 receives a date adjustment and modifies the indication of the electronic check for the particular date in the electronic account register in accordance with the date adjustment.

The balance subsystem 520 calculates a balance of a user account of the providing user, provides the balance for presentation in the user interface, and/or determines whether a user account will be below a balance threshold upon completion of the electronic funds transfer associated with the user account. The balance may be a running balance in accordance with one or more electronic checks.

The electronic funds transfer initiation subsystem 522 initiates the electronic funds transfer in the payment amount from the providing user to the receiving user in accordance with the payment date selection. The initiation of the electronic funds transfer in the payment amount from the providing user to the receiving user may be in accordance with the date selection, the date adjustment, and/or a determination of whether the user account will be bellow a balance threshold.

The completion determination subsystem 524 determines whether a transaction has not completed beyond an anticipated clearing date for a particular electronic check.

The appearance alteration subsystem 526 alters the appearance of one or more electronic check indications in accordance with a running balance computed by the balance subsystem and/or the determination of whether a transaction has not completed. The alert provider subsystem 528 provides an alert regarding the initiating of the electronic funds transfer.

The categorization subsystem 530 associates a category designated with the electronic check and/or indicate the category of the electronic check in the electronic account register.

The charge analysis subsystem 532 receives an estimated charge and an identifier for the estimated charge, indicates the estimated charge and the identifier in the electronic account register, analyzes one or more actual charges, replaces the estimated charge with a particular actual charge of the one or more actual charges in accordance with the analyzing of the one or more actual charges, and/or indicates the actual charge in the electronic account register. The electronic account register utilization subsystem 534 utilizes the electronic account register for the providing user associated with the user account.

Figure 6:
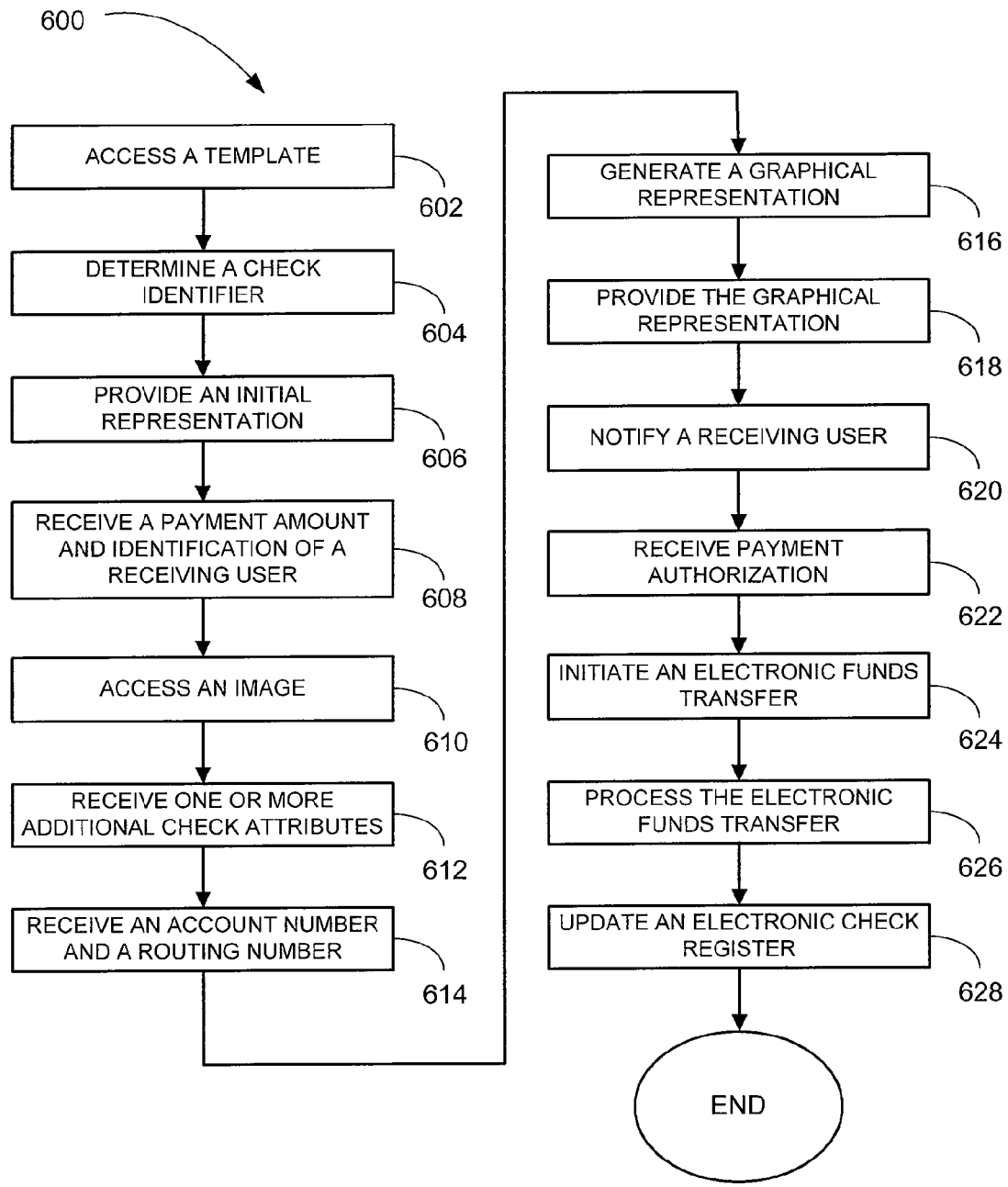
FIG. 6 is a flowchart illustrating a method for electronic funds transfer initiation in accordance with an example embodiment.

FIG. 6 illustrates a method 600 for electronic funds transfer initiation according to an example embodiment. The method 600 may be performed by the providing user device 102, the receiving user device 106, and/or the provider 108 (see FIG. 1) or otherwise performed.

A template associated with a providing user of an electronic check may be accessed at block 602. A check identifier for the electronic check may be determined at block 604. The check identifier may be selected by the providing user, automatically generated, or otherwise provided. An initial representation of an electronic check may be provided at block 606. For example, the electronic check may be provided for presentation to a providing user associated with the providing user device 102 (see FIG. 1).

A payment amount and identification of a receiving user for an electronic check is received (e.g., from the providing user) at block 608. The identification of the receiving user may include, by way of example, a full name of the receiving user, a user name of the receiving user, a member number of the receiving user, or the like.

An image identified by the providing user may be accessed at block 610. The image may be an electronic photograph (e.g., a picture of a person) or a pattern. The image may be accessed when received from the providing user. A number of available images may be provided for presentation to the providing user and an identification of the image from the available images may be received from the providing user. The image may be accessed otherwise.

One or more additional electronic check attributes for the electronic check may be received at block 612. The additional electronic check attributes may include, by way of example, a payment description, a payment date, a signature, or the like. The signature of the electronic check may be a biometric signature, a fingerprint, a presubmitted signature, or the like. However, other types of e-signatures may also be used.

An account number and a routing number for the electronic check may be received at block 614. The account number may be associated with the providing user and/or the receiving user. For example, a request for the account number and the routing number may be sent for the receiving user and, in response, the account number and the routing number may be received. The payment association of the receiving user with the account number and the routing number when received may be stored (e.g., in the database 110) for further access.

The graphical representation of the electronic check may be generated at block 616. The graphical representation may be generated in accordance with a template, an image, the payment amount, the payment description, the payment date, a signature, a check identifier (e.g., a check number), and/or the identification of the receiving user. Other elements may also be used to generate the graphical representation. The graphical representation of the electronic check is provided for presentation to the providing user at block 618. For example, the electronic check may be provided from the receiving user device 106 or the provider 108 to the providing user device for presentation to the providing user.

The receiving user of the electronic check is notified regarding the electronic check at block 620. The notification may be provided by providing the electronic check to the receiving user over the network 104 (see FIG. 1) or by printing the electronic check and providing the printed electronic check to the receiving user. The receiving user may also be notified in other ways.

Payment authorization may be received from the providing user at block 622.

At block 624, an electronic funds transfer is initiated in the payment amount from the providing user to the receiving user. The electronic funds transfer may be, by way of example, an Automated Clearing House (ACH) electronic funds transfer, a user-to-user electronic funds transfer, or the like. The initiation of the electronic funds transfer may be made in accordance with the payment date, payment authorization, and/or the account number and the routing number of the receiving user and/or the providing user. The electronic funds transfer may be processed in the payment amount from the providing user to the receiving user at block 626. The electronic funds transfer may be processed by the provider 108 or a different provider.

Figure 7:
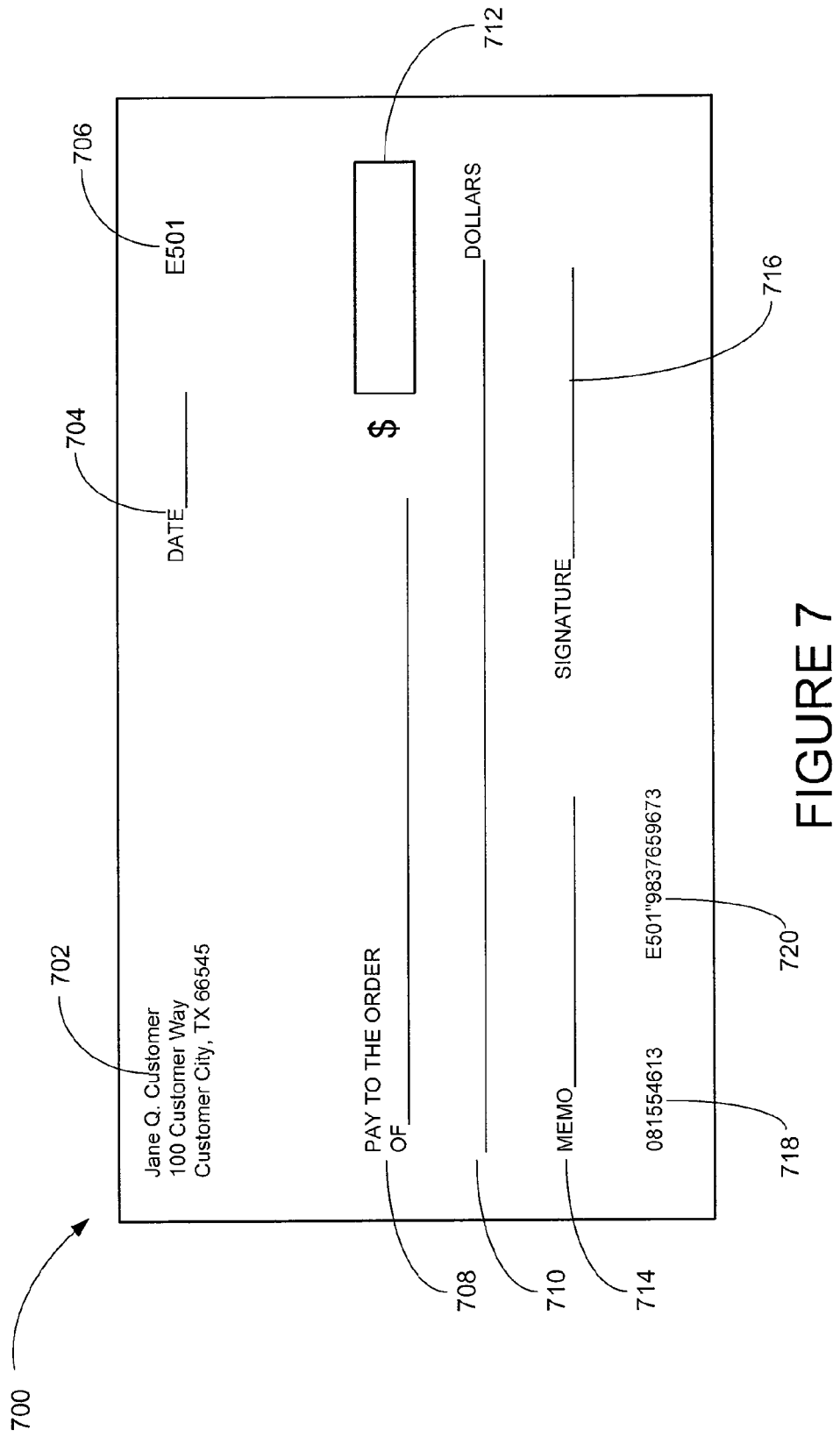
FIG. 7 is a is a diagram of an example initial representation in accordance with an example embodiment.

An electronic account register associated with the providing user may be updated in accordance with the initiating of the electronic funds transfer at block 628. For example, the electronic account register FIG. 7 is a diagram of an example initial representation 700 of an electronic check according to an example embodiment. The initial representation 700 may be provided during the operations performed at block 606 (see FIG. 6) or a different initial representation may be provided.

The initial representation 700 may include a providing user identification 702 to identify a providing user associated with the electronic check. A date field 704 may receive a transaction date for the electronic check. A check identifier 706 may be determined by the operations performed at block 604 (see FIG. 6).

The receiving user field 708 may receive a receiving user associated with the electronic check. Payment fields 710, 712 may receive a value to be provided with an electronic funds transfer associated with the electronic check. A memo field 714 may receive a description of the electronic check. A signature field 716 may receive a signature associated with the electronic check.

A routing number 718 and an account number 720 may be included in the initial representation 700 of the electronic check. The routing number 718 and the account number 720 may be associated with the providing user or the receiving user. The initial representation 700 may be helpful to a user that is transitioning from making paper payments to making electronic papers visual the process of the electronic bill pay.

Figure 8:
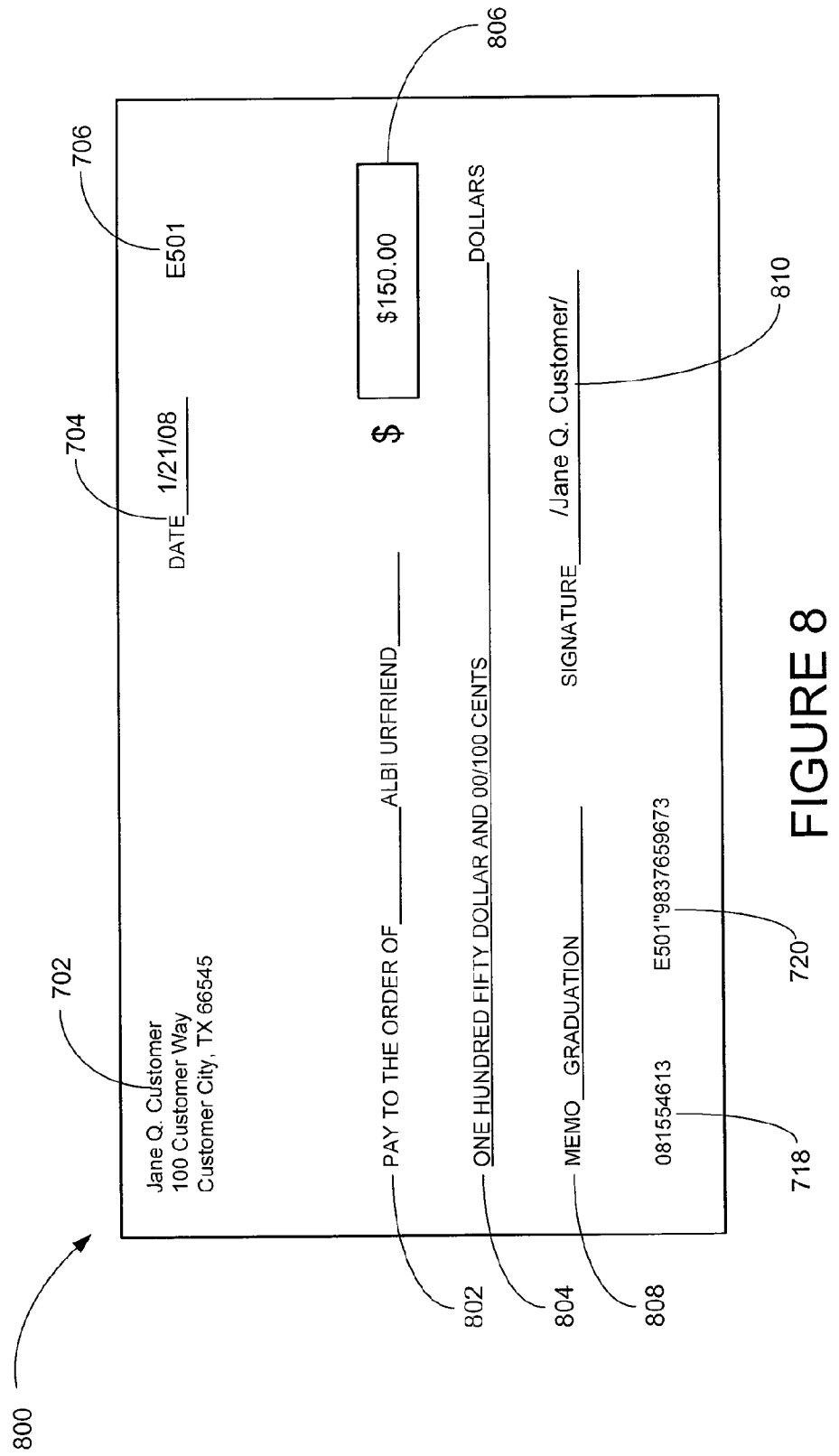
FIGS. 8 and 9 are diagrams of example graphical representations in accordance with an example embodiment.

FIG. 8 is a diagram of an example graphical representation 800 of an electronic check according to an example embodiment. The graphical representation 800 may be a completed version of the initial representation 700 (see FIG. 7). The graphical representation 800 may include a completed receiving user field 802, completed payment fields 804, 806, a completed memo field 808, and a signed signature field 810.

Figure 9:
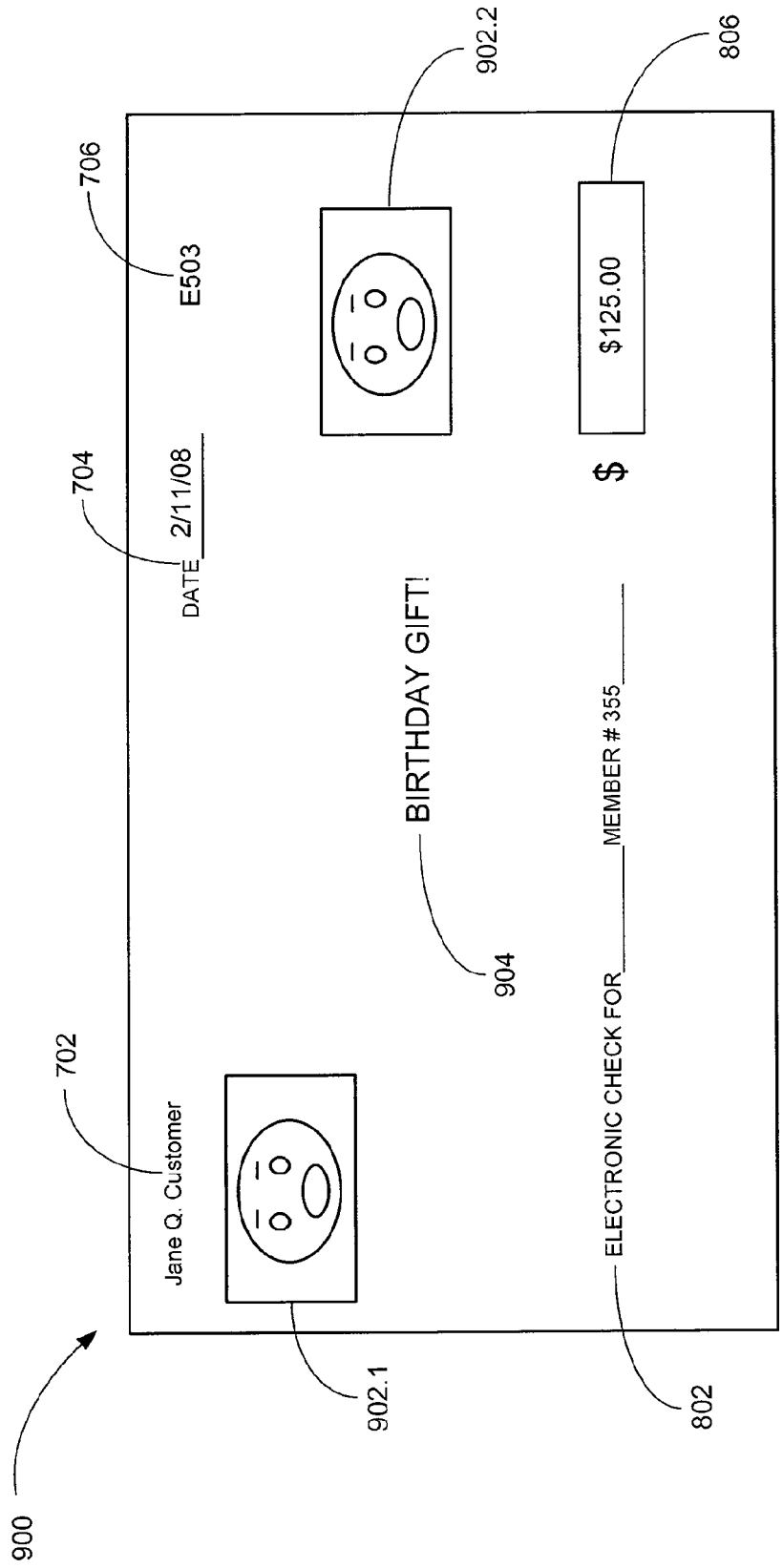

FIG. 9 is a diagram of an example graphical representation 900 of an electronic check according to an example embodiment. The graphical representation 900 is a different representation of an electronic check from the graphical representation 800 (see FIG. 8) that includes alternate attributes.

The graphical representation 900 includes the providing user identification 702, the date field 704, and the check identifier 706. The graphical representation 900 further includes the completed receiving user field 802 and the completed payment field 806. The graphical representation 900 may also include images 902.1, 902.2 and a message 904.

Figure 10:
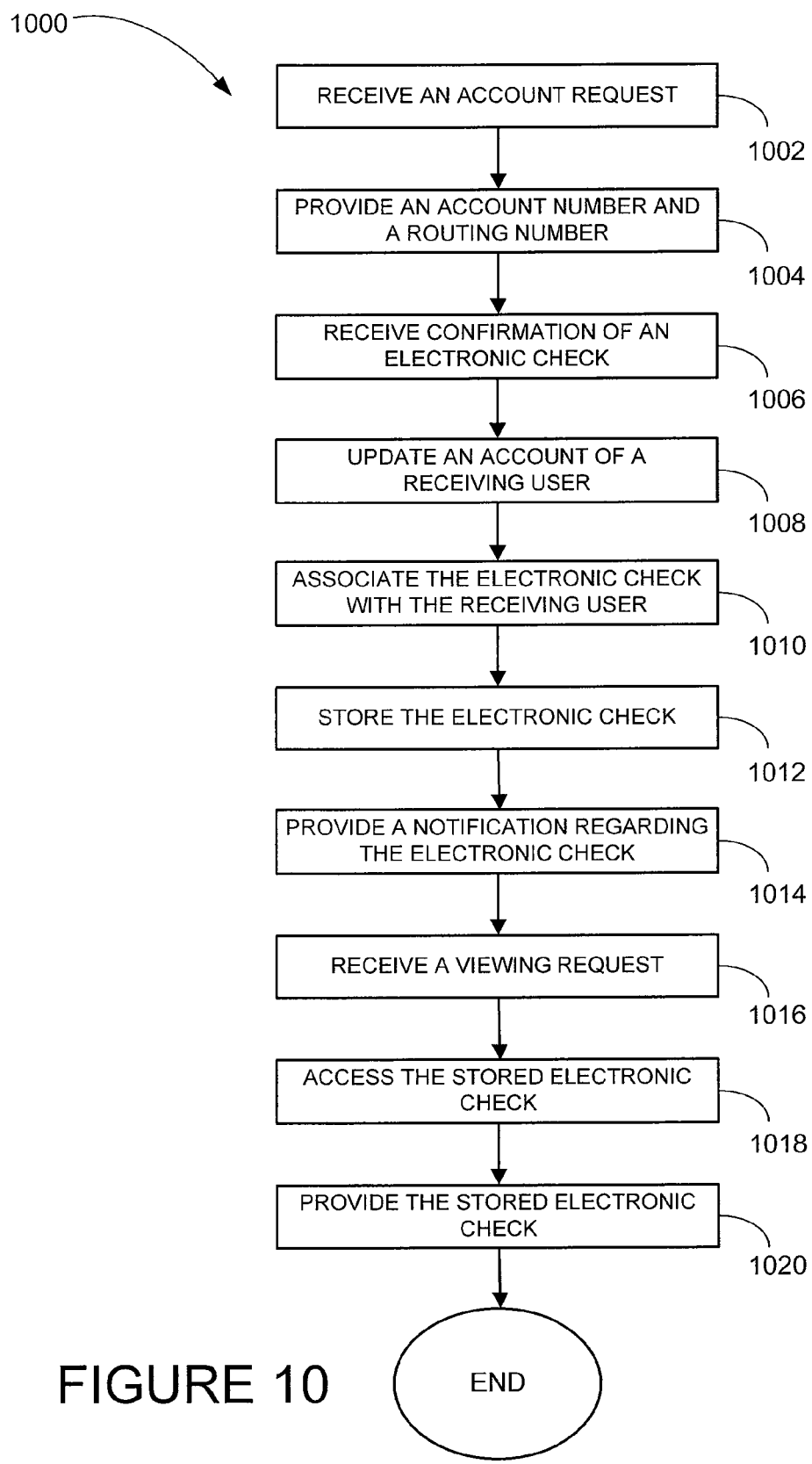
FIGS. 10 and 11 are flowcharts illustrating a method for electronic check processing in accordance with an example embodiment.

FIG. 10 illustrates a method 1000 for electronic check processing according to an example embodiment. The method 1000 may be performed by the providing user device 102, the receiving user device 106, and/or the provider 108 (see FIG. 1) or otherwise performed.

An account request for an account number and a routing number of the account of the receiving user may be received at block 1002. The account number and the routing number may be provided at block 1004.

Confirmation of an electronic check in a payment amount from a providing user to a receiving user is received at block 1006. The account of the receiving user is updated in accordance with an electronic funds transfer associated with the electronic check at block 1008.

The electronic check may be associated with the receiving user at block 1010. The electronic check may be stored at block 1012. A notification regarding the electronic check is provided to the receiving user at block 1014.

A viewing request for the electronic check may be received at block 1016. The stored electronic check may be accessed at block 1018. The stored electronic check may be provided for presentation at block 1020.

Figure 11:
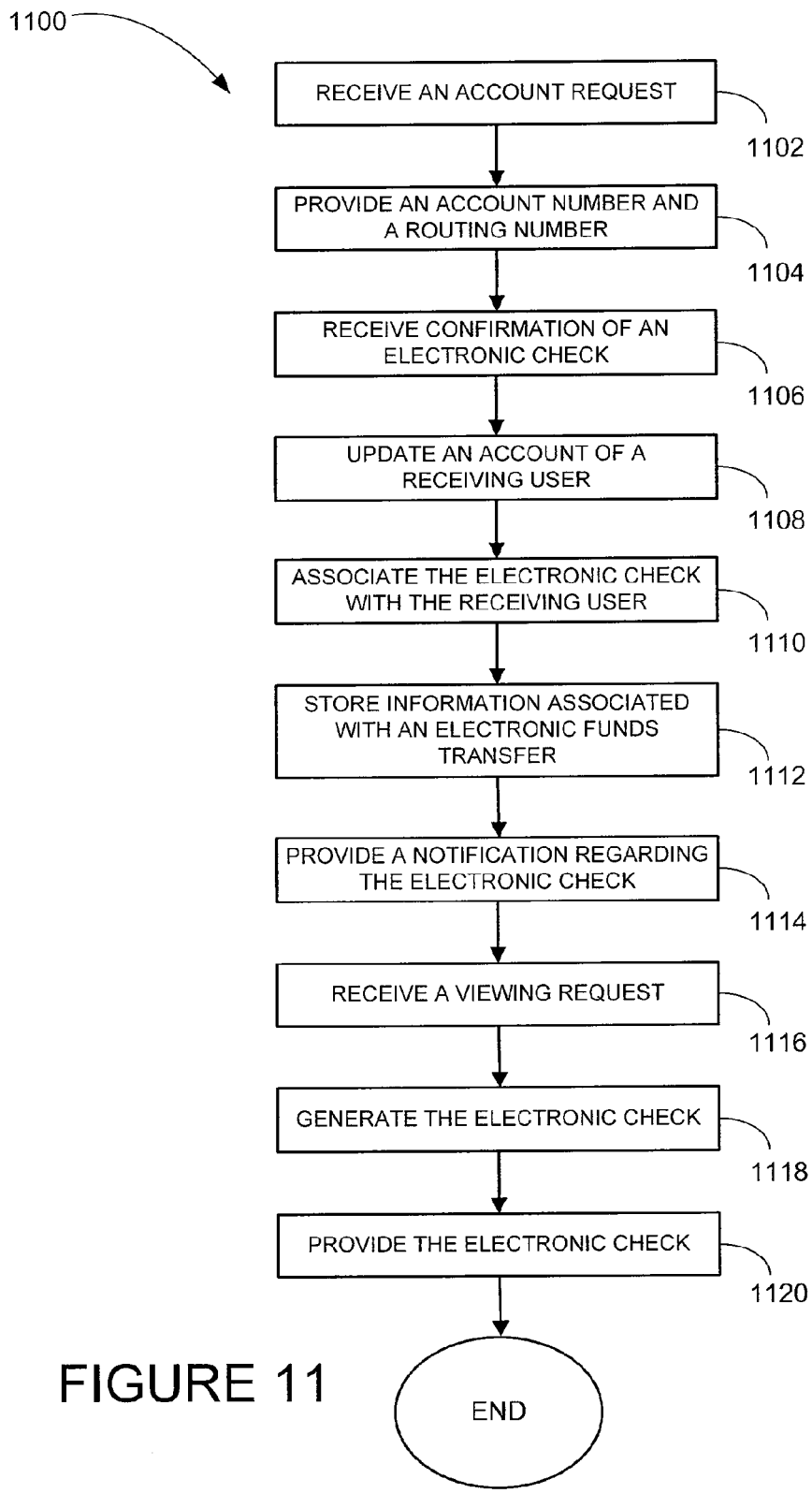

FIG. 11 illustrates a method 1100 for electronic check processing according to an example embodiment. The method 1100 may be performed by the providing user device 102, the receiving user device 106, and/or the provider 108 (see FIG. 1) or otherwise performed.

An account request for an account number and a routing number of the account of the receiving user may be received at block 1102. The account number and the routing number may be provided at block 1104.

Confirmation of an electronic check in a payment amount from a providing user to a receiving user is received at block 1106. The account of the receiving user is updated in accordance with an electronic funds transfer associated with the electronic check at block 1108. The electronic check may be associated with the receiving user at block 1110.

Information associated with the electronic funds transfer may be stored at block 1112. The information may include the payment amount and identification of the providing user. A notification regarding the electronic check is provided to the receiving user at block 1114.

A viewing request for the electronic check may be received at block 1116. The electronic check may be generated from the stored information at block 1118. The generated electronic check may be provided for presentation at block 1120.

In an example embodiment, the method 1000 (see FIG. 10) may be used when accessing stored checks, and the method 1100 may be used when accessing information associated with stored checks and generating the check from the stored information.

Figure 12:
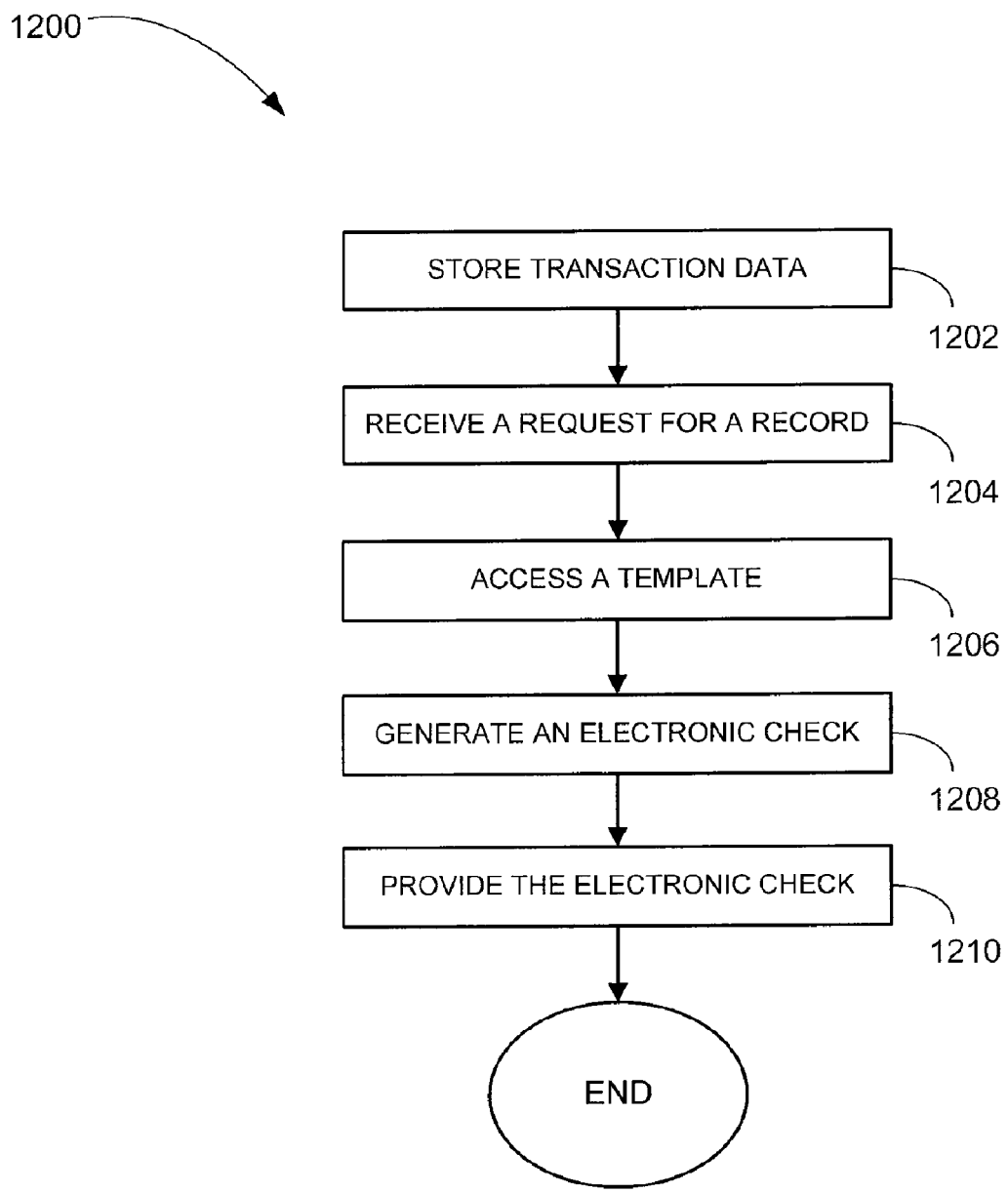
FIG. 12 is a flowchart illustrating a method for electronic check generation in accordance with an example embodiment.

FIG. 12 illustrates a method 1200 for electronic check generation to an example embodiment. The method 1200 may be performed by the providing user device 102, the receiving user device 106, and/or the provider 108 (see FIG. 1) or otherwise performed.

Transaction data associated with an electronic funds transfer may be stored at block 1202. The transaction data may include payment amount, receiving user identification, and providing user identification.

A request for a record of an electronic check associated with the electronic funds transfer is received at block 1204. A template associated with the providing user may be accessed at block 1206.

The electronic check is generated in accordance with the payment amount, the receiving user identification, the providing user identification and/or the template at block 1208.

The electronic check is provided in accordance with the request at block 1210. The electronic check may be provided to a providing user and/or a receiving user for presentation.

Figure 13:
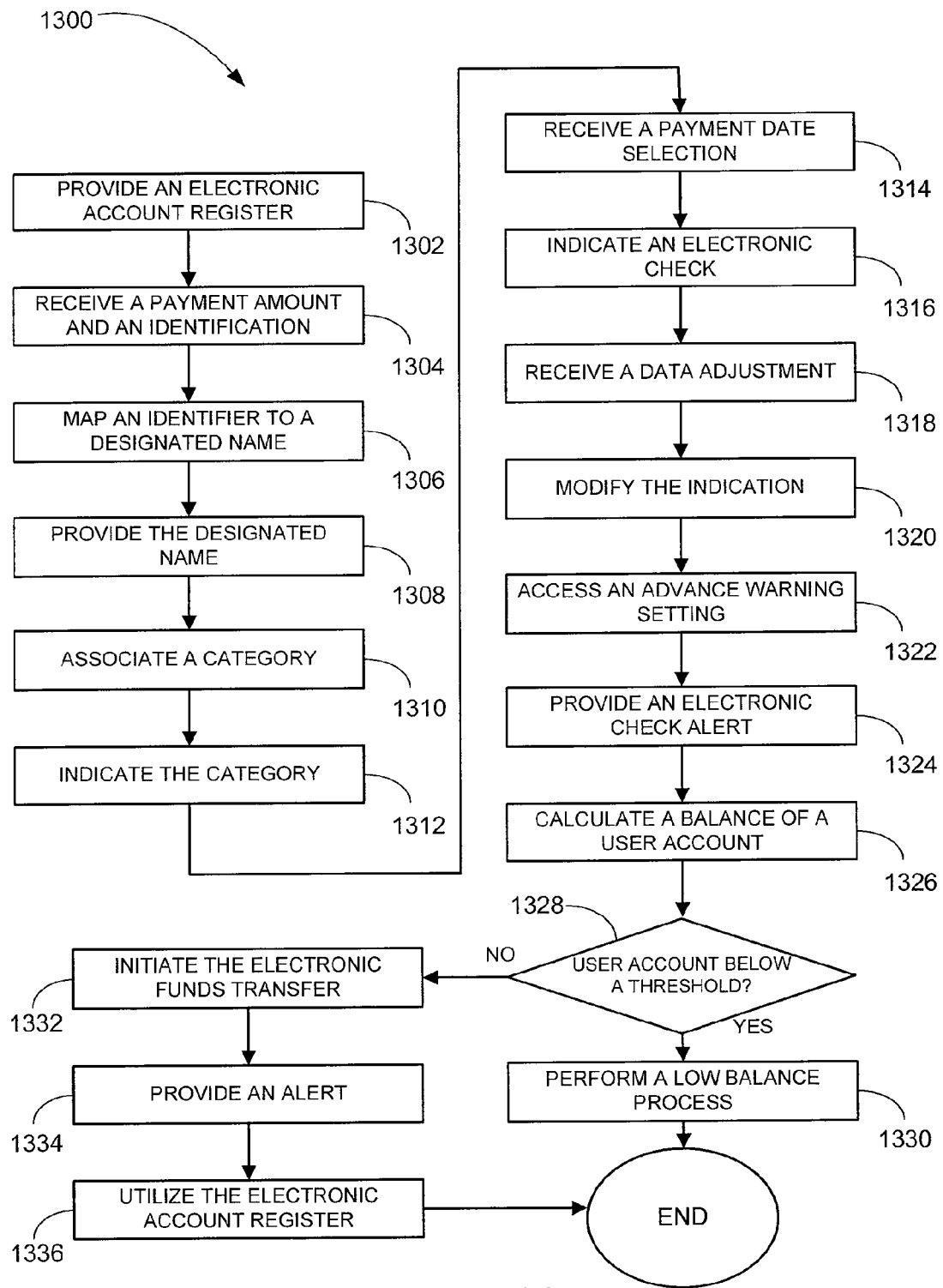
FIG. 13 is a flowchart illustrating a method for electronic account register management in accordance with an example embodiment.

FIG. 13 illustrates a method 1300 for electronic account register management to an example embodiment. The method 1300 may be performed by the providing user device 102, the receiving user device 106, and/or the provider 108 (see FIG. 1) or otherwise performed.

An electronic account register is provided for presentation to a providing user in a user interface at block 1302. A payment amount and identification of a receiving user for an electronic check is received at block 1304.

An identifier of the electronic check may be mapped to a designated name within the electronic account register at block 1306. The designated name may be provided within electronic account register for presentation at block 1308.

A category designated with the electronic check may be associated at block 1310. The category of the electronic check may be indicated in the electronic account register at block 1312.

A payment date selection for the electronic check is received on a particular date within the electronic account register at block 1314. The electronic check is indicated for the particular date in the electronic account register at block 1316.

A date adjustment may be received at block 1318. The indication of the electronic check for the particular date in the electronic account register may be modified in accordance with the date adjustment at block 1320.

An advanced warning setting may be accessed at block 1322. An electronic check alert may be provided in accordance with the particular date, the date adjustment, and/or the advanced warning setting at block 1324.

A balance of a user account of the providing user may be calculated at block 1326. In an example embodiment, the balance of the user account may be provided for presentation to the providing user. At decision block 1328, a determination may be made as to whether the user account will be below a balance threshold upon completion of the electronic funds transfer. If a determination is made that the user account will be below a balance threshold, a low balance process may be performed at block 1330. The low balance process may include providing a warning to the providing user, cancelling the electronic funds transfer, or the like. If a determination is made that the user account will not be below a balance threshold at decision block 1328, the method 1300 may proceed to block 1332.

At block 1332, the electronic funds transfer in the payment amount may be initiated from the providing user to the receiving user in accordance with the payment date selection, the date selection, and/or the determining of whether the user account will be below a balance threshold.

An alert regarding the initiating of the electronic funds transfer may be provided at block 1334. The electronic account register may be utilized by the providing user associated with the user account at block 1336.

FIG. 14 is a diagram of an example electronic account register 1400 according to an example embodiment. The electronic account register 1400 may be used during the operations of the method 1300 (see FIG. 13). However, other representations may also be used.

The electronic account register 1400 may include a number of entries 1402.1-1402.n. A check number column 1404 may includes entries for electronic, nonelectronic check numbers, and/or debit transactions. A date column 1406 may include entries for the dates of electronic, nonelectronic checks (e.g., printed checks), and debit transactions. A description column 1408 may include entries for the descriptions of the electronic, nonelectronic checks and debit transactions. A payment/debit amount column 1410 may include entries for the amount of payments and/or debits.

A category column 1412 may include entries for categories associated with electronic checks, nonelectronic checks, and debit transactions. A fee column 1414 may include entries indicating a fee (e.g., an ATM fee) associated with electronic checks, nonelectronic checks, and debit transactions.

A deposit column 1416 may include entries for amounts of deposits made to a user account associated with the electronic account register 1400. A balance column 1418 may include entries reflecting a running balance of the user account associated with the electronic account register 1400.

FIG. 15 is a diagram of an example electronic account register 1500 according to an example embodiment. The electronic account register 1500 may include corresponding columns to the electronic account register 1400 (see FIG. 14). However, the identifier contained in the description of entries 1502.2, 1503.3, and 1502.n are shown to be mapped to a designated name.

Figure 16:
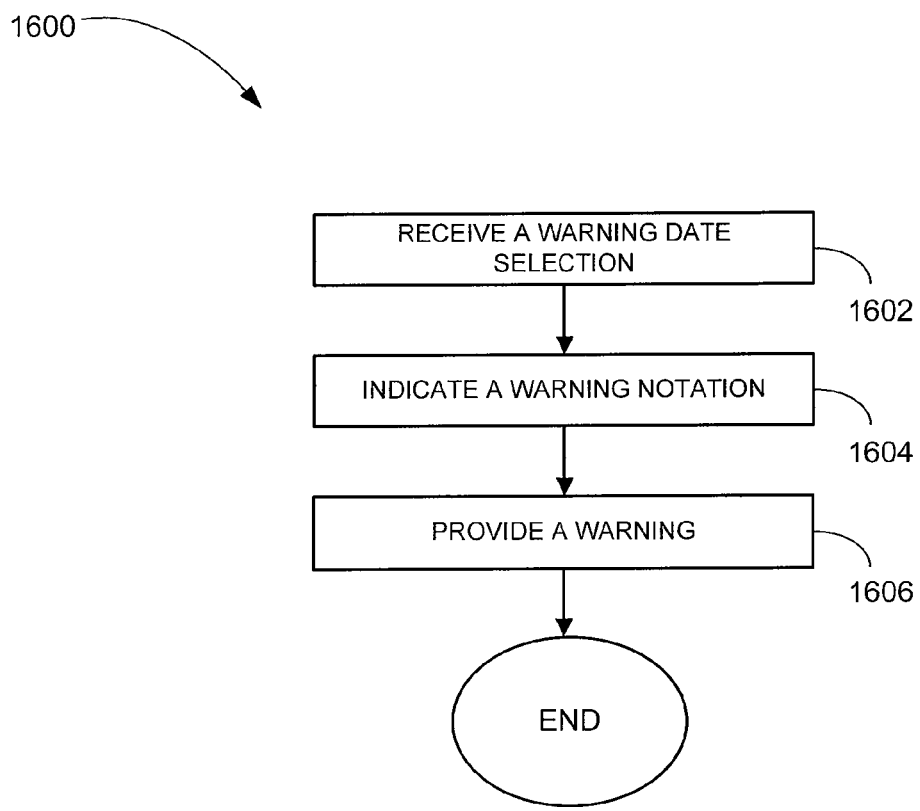
FIGS. 16-20 are flowcharts illustrating a method for electronic account register utilization in accordance with an example embodiment.

FIG. 16 illustrates a method 1600 for electronic account register utilization to an example embodiment. The method 1600 may be performed at block 1336 (see FIG. 10) or otherwise performed.

A warning date selection of another particular date of the electronic account register for the electronic check is received at block 1602. A warning notation within the electronic check for another particular date may be indicated in the electronic account register at block 1604. A warning is provided to the providing user in accordance with the warning date selection at block 1606.

Figure 17:
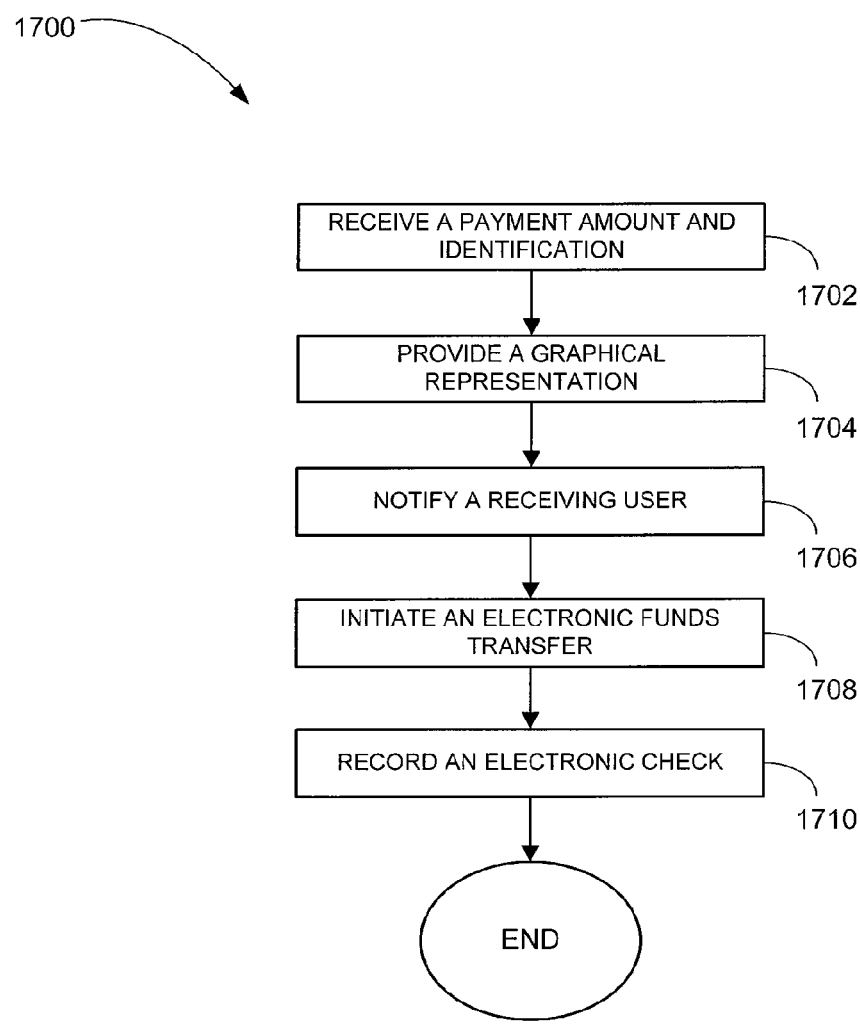

FIG. 17 illustrates a method 1700 for electronic account register utilization to an example embodiment. The method 1700 may be performed at block 1336 (see FIG. 10) or otherwise performed.

A payment amount and identification of a receiving user for an electronic check is received at block 1702. A graphical representation of the electronic check is provided for presentation to the providing user at block 1704. The graphical representation may include the payment amount and the identification of the receiving user.

The receiving user of the electronic check is notified at block 1706. An electronic funds transfer is initiated in the payment amount from the providing user to the receiving user at block 1708. The electronic check is recorded in the electronic account register at block 1710.

Figure 18:
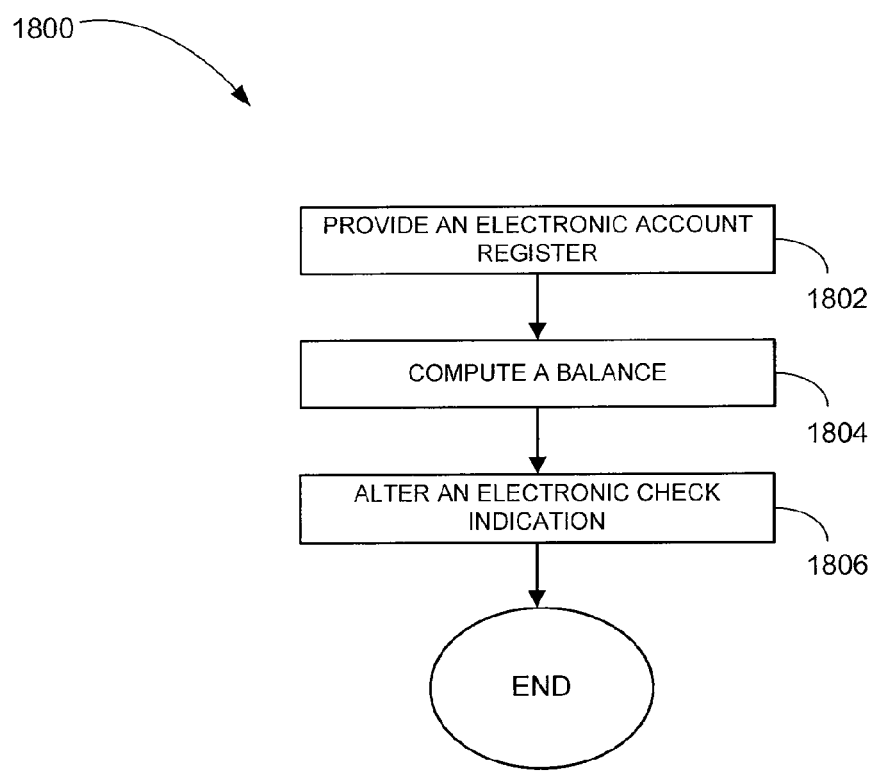

FIG. 18 illustrates a method 1800 for electronic account register utilization to an example embodiment. The method 1800 may be performed by the providing user device 102, the receiving user device 106, and/or the provider 108 (see FIG. 1) or otherwise performed.

An electronic account register is provided for presentation to a providing user in a user interface at block 1802. The electronic account register may indicate one or more electronic checks scheduled for processing at a future date.

A balance is computed in accordance with the one or more electronic checks at block 1804. At block 1806, the appearance of one or more of the electronic check indications may be altered in accordance with the computed running balance.

Figure 19:
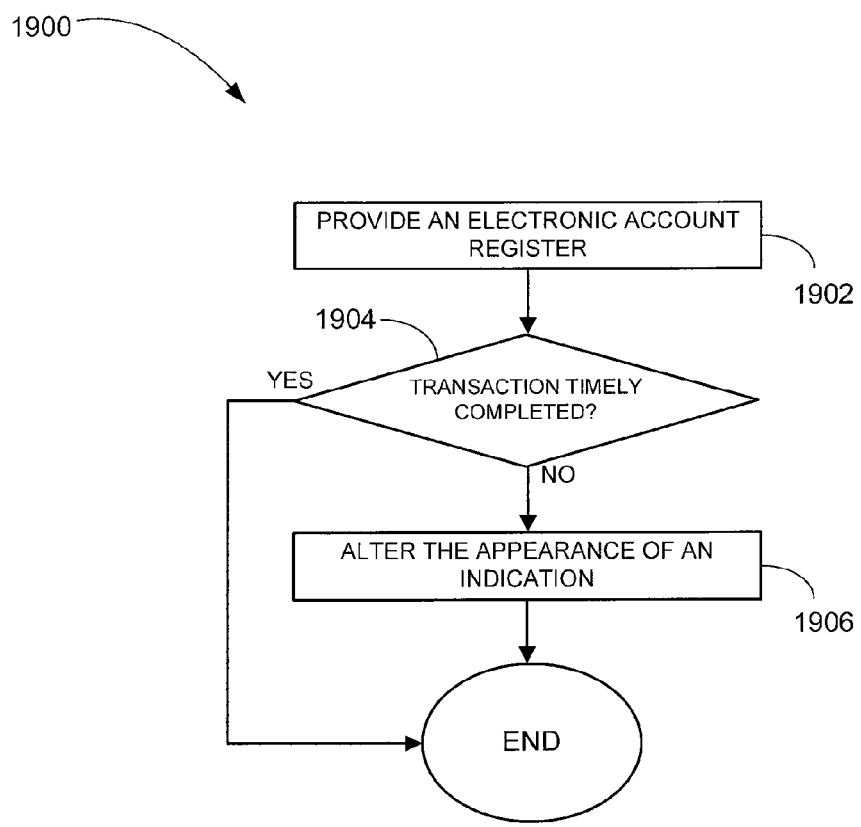

FIG. 19 illustrates a method 1900 for electronic account register utilization to an example embodiment. The method 1900 may be performed by the providing user device 102, the receiving user device 106, and/or the provider 108 (see FIG. 1) or otherwise performed.

An electronic account register is provided for presentation to a providing user in a user interface at block 1902. The electronic account register may include indications of one or more electronic checks.

At decision block 1904, a determination may be made whether a transaction has not completed beyond an anticipated clearing date for an electronic check. If a determination is made that the transaction has not completed, the appearance of an indication of the electronic check may be altered within the user interface at block 1906. If a determination is made that the transfer has completed or is within the anticipated clearing date at decision block 1904, or upon completion of the operations at block 1906, the method 1900 may terminate.

Figure 20:
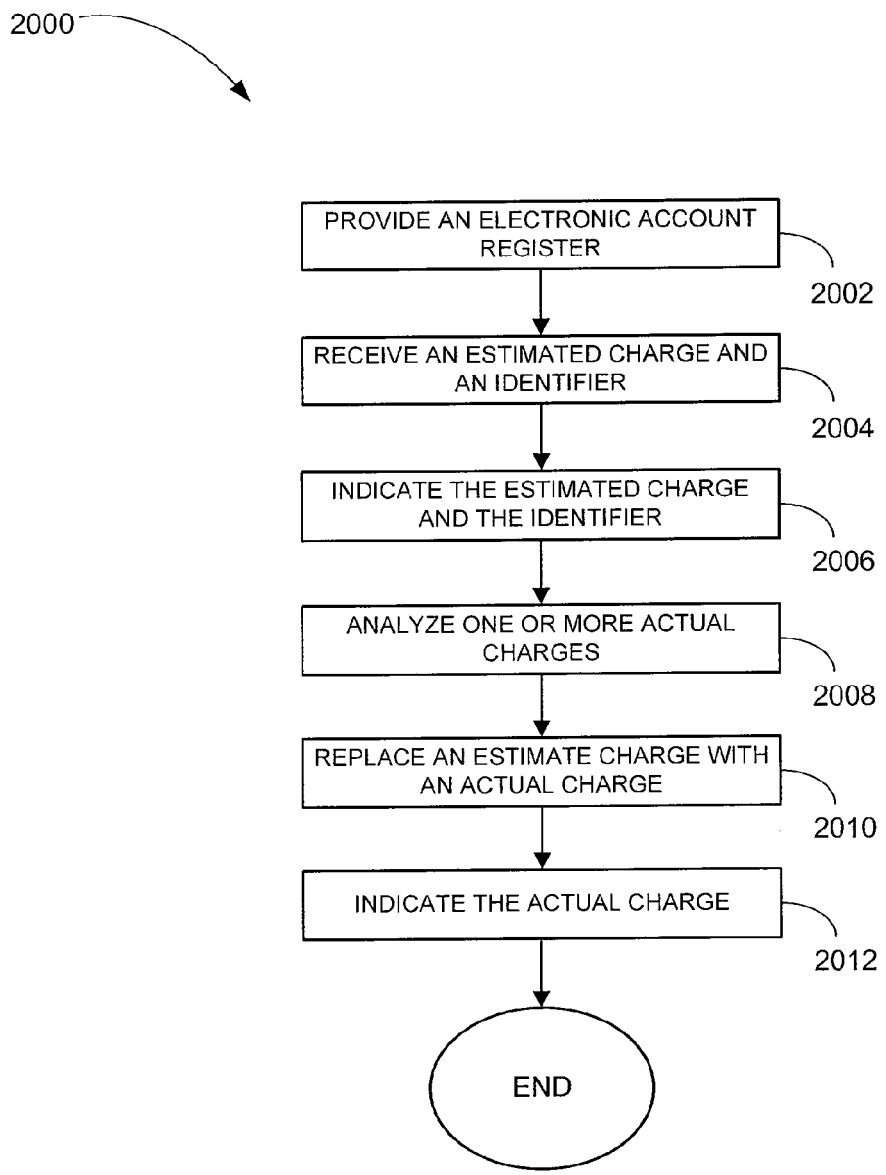

FIG. 20 illustrates a method 2000 for electronic account register utilization to an example embodiment. The method 2000 may be performed by the providing user device 102, the receiving user device 106, and/or the provider 108 (see FIG. 1) or otherwise performed.

An electronic account register is provided for presentation to a providing user in a user interface at block 2002. An estimated charge and an identifier for the estimated charge are received at block 2004. The estimated charge and the identifier are indicated in the electronic account register at block 2006.

One or more actual charges are analyzed at block 2008. The analysis may further include receiving a matching selection of a particular charge and/or matching the estimated charge to an actual charge in accordance with a matching criterion.

The estimated charge is replaced with an actual charge in accordance with the analyzing of the one or more actual charges at block 2010. The actual charge is indicated in the electronic account register at block 2012.

Figure 21:
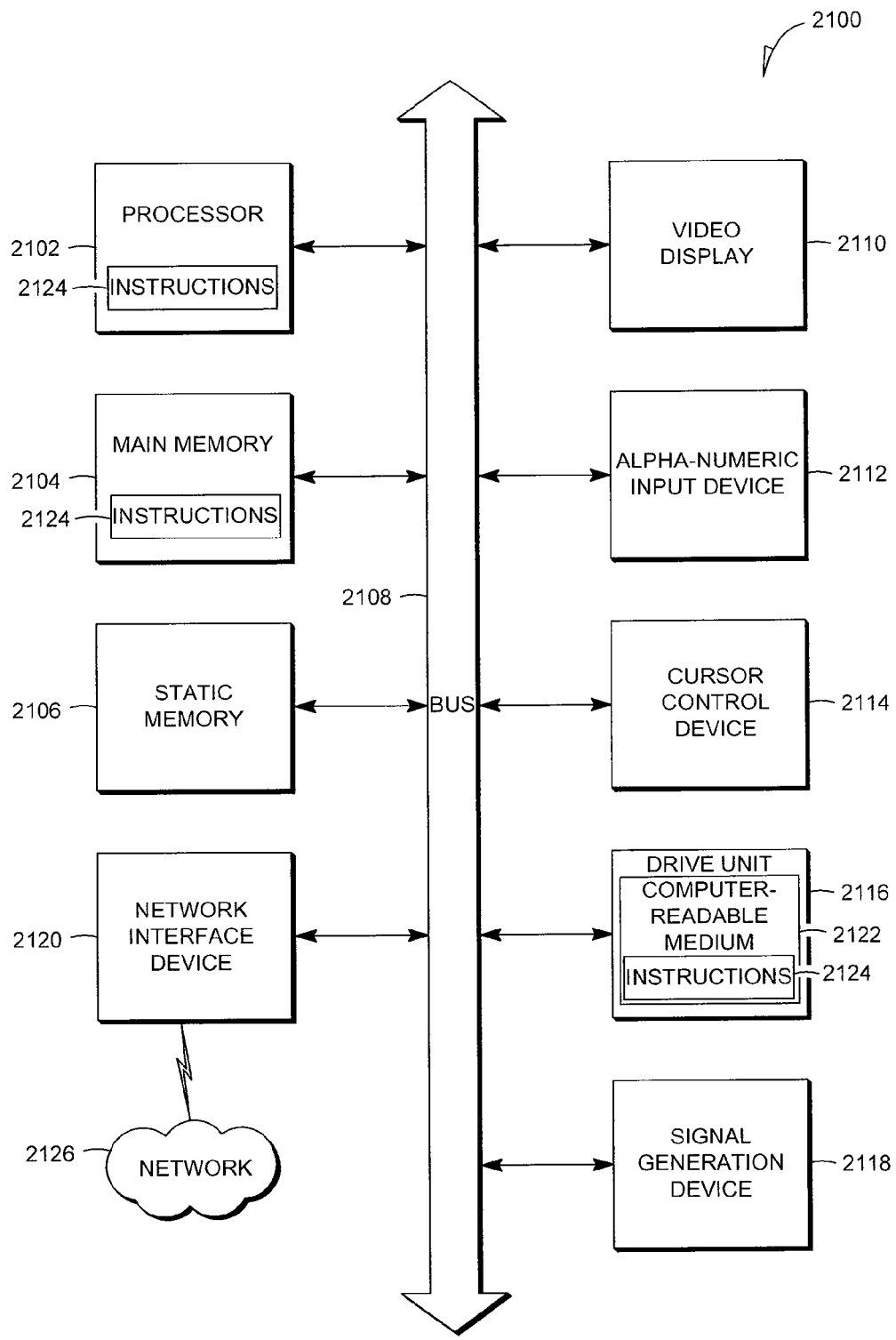
FIG. 21 illustrates a diagrammatic representation of a machine in the example form of a computer system within which a set of instructions for causing the machine to perform any one or more of the methodologies discussed herein may be executed.

FIG. 21 shows a diagrammatic representation of machine in the example form of a computer system 2100 within which a set of instructions may be executed causing the machine to perform any one or more of the methods, processes, operations, or methodologies discussed herein. The provider 108 may be deployed on the computer system 2100. The providing user device 102 and/or the receiving user device 106 may include the functionality of the computer system 2100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU) a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a cursor control device 2114 (e.g., a mouse), a drive unit 2116, a signal generation device 2118 (e.g., a speaker) and a network interface device 2120.

The drive unit 2116 includes a machine-readable medium 2122 on which is stored one or more sets of instructions (e.g., software 2124) embodying any one or more of the methodologies or functions described herein. The software 2124 may also reside, completely or at least partially, within the main memory 2104 and/or within the processor 2102 during execution thereof by the computer system 2100, the main memory 2104 and the processor 2102 also constituting machine-readable media.

The software 2124 may further be transmitted or received over a network 2126 via the network interface device 2120.

While the machine-readable medium 2122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for electronic checking have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
using a computer system to store transaction data associated with transactions indicated by a set of register entries associated with a user having an account with a financial institution, at least some of the transactions being electronic funds transfers, at least one register entry being associated with presenting a graphical representation of an electronic check by the financial institution to the user via a graphical interface system, the graphical representation of the electronic check including a set of fields defining the respective transaction data for a transaction associated with the electronic check;
calculating, using a computer system, a transaction time for each of the set of register entries being a time at which the transaction associated with the respective register entry is predicted to affect the user's account with the financial institution;
determining an alert triggered by at least one of the set of register entries indicating that effectuating the associated transaction at the calculated transaction time will cause a balance of the user's account with the financial institution to cross a predetermined account threshold;
generating a graphical representation of an electronic register for display to the user via the graphical interface system, the graphical representation of the electronic register being generated to display at least a portion of the set of register entries and to display a graphical indication of the alert in association with the at least one of the set of entries that triggered the alert; and
displaying the graphical representation of the electronic register to the user via the graphical interface system.

2. The method of claim 1, further comprising:
accessing a template associated with the user; and
generating the electronic check in accordance with the template.

3. The method of claim 1, wherein the presenting the graphical representation of the electronic check by the financial institution to the user via a graphical interface system comprises:
providing the electronic check to the user for presentation as a providing user engaging in one of the electronic funds transfers.

4. The method of claim 1, wherein the presenting the graphical representation of the electronic check by the financial institution to the user via a graphical interface system comprises:
providing the electronic check to the user for presentation as a receiving user engaging in one of the electronic funds transfers.

5. The method of claim 1, wherein the electronic funds transfer is an Automated Clearing House (ACH) electronic funds transfer.

6. The method of claim 1, wherein the electronic funds transfer is a user-to-user electronic funds transfer.

7. The method of claim 1, wherein the electronic check further includes at least one of a payment description, a payment date, a signature, a check identified, an image, or combinations thereof.

8. The method of claim 1, wherein determining the alert triggered by at least one of the set of register entries further comprises:
determining that effectuating the associated transaction at the calculated transaction time will cause the balance of the user's account with the financial institution to drop below a predetermined minimum account balance.

9. The method of claim 1, wherein generating a graphical representation of an electronic register for display to the user via the graphical interface system further comprises:
prompting the user to adjust one or more of the transaction times associated with one or more of the displayed portion of the set of entries to an authorized alternate transaction time, such that the associated transaction will be scheduled to affect the user's account substantially at the authorized alternate transaction time instead of at the calculated transaction time.

10. The method of claim 1, wherein generating a graphical representation of an electronic register for display to the user via the graphical interface system further comprises:
outputting an audio indication of the alert to the user via the graphical interface system.

11. An article of manufacture comprising a machine-readable medium having instructions thereon, which when implemented by one or more processors perform the following operations:
store transaction data associated with transactions indicated by a set of register entries associated with a user having an account with a financial institution, at least some of the transactions being electronic funds transfers;
calculate, using a computer system, a transaction time for each of the set of register entries being a time at which the transaction associated with the respective register entry is predicted to affect the user's account with the financial institution;
determine an alert triggered by at least one of the set of register entries indicating that effectuating the associated transaction at the calculated transaction time will cause a balance of the user's account with the financial institution to cross a predetermined account threshold;
generate a graphical representation of an electronic register for display to the user via a graphical interface system, the graphical representation of the electronic register being generated to display at least a portion of the set of register entries and to display a graphical indication of the alert in association with the at least one of the set of entries that triggered the alert; and
cause the graphical representation of the electronic register to be displayed to the user via the graphical interface system.

12. The machine-readable medium of claim 11 further comprising instructions, which when implemented by one or more processors perform the following operations:
access a template associated with the user; and
generate an electronic check for presentation to the user configured to be used to effectuate an electronic funds transfer and to gather at least some of the transaction data associated with the electronic funds transfer,
wherein generation of the electronic check is in accordance with the template.

13. The machine-readable medium of claim 12, wherein the electronic check further includes at least one of a payment description, a payment date, a signature, a check identified, an image, or combinations thereof.

14. The machine-readable medium of claim 11, wherein the electronic funds transfer is an Automated Clearing House (ACH) electronic funds transfer.

15. The machine-readable medium of claim 11, wherein the electronic funds transfer is a user-to-user electronic funds transfer.

16. A system comprising:
a transaction data store for storing transaction data defining transactions associated with a user having an account with a financial institution, at least some of the transactions being electronic funds transfers;
an alert detection system, communicatively coupled with the transaction data store, and configured to:
calculate a transaction time for each of a set of register entries being a time at which the transaction associated with the respective register entry is predicted to affect the user's account with the financial institution, each of the set of register entries corresponding to one of the transactions defined by a portion of the transaction data; and
determine an alert triggered by at least one of the set of register entries indicating that effectuating the associated transaction at the calculated transaction time will cause a balance of the user's account with the financial institution to cross a predetermined account threshold; and
an interface system, communicatively coupled with the transaction data store and the alert detection system, and configured to:
generate a graphical representation of an electronic register for display to the user, the graphical representation of the electronic register being generated to display at least a portion of the set of register entries and to display a graphical indication of the alert in association with the at least one of the set of entries that triggered the alert; and
display the graphical representation of the electronic register to the user.

17. The system of claim 16, further comprising:
a graphical generation system, communicatively coupled with the transaction data store and the interface system, and configured to access a template associated with the user,
wherein the interface system is configured to generate the graphical representation in accordance with the template and a portion of the transaction data.

18. The system of claim 16, wherein the graphical representation is provided to the user indicating transactions for which the user is a providing user of funds for the respective transactions.

19. The system of claim 16, wherein the graphical representation is provided to the user indicating transactions for which the user is a receiving user of funds for the respective transactions.

20. The system of claim 16, wherein the electronic funds transfer is an Automated Clearing House (ACH) electronic funds transfer.

21. The system of claim 16, wherein the electronic funds transfer is a user-to-user electronic funds transfer.

* * * * *